US012743080B2

(12) United States Patent
Husain et al.

(10) Patent No.: US 12,743,080 B2
(45) Date of Patent: Sep. 22, 2026

(54) PREVENTING REGRESSIONS IN NAVIGATION DETERMINATIONS USING LOGGED TRAJECTORIES

(71) Applicant: GDM Holding LLC, Mountain View, CA (US)

(72) Inventors: Ammar Husain, San Francisco, CA (US); Ting Lu, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 68 days.

(21) Appl. No.: 18/812,947

(22) Filed: Aug. 22, 2024

(65) Prior Publication Data

US 2024/0419169 A1 Dec. 19, 2024

Related U.S. Application Data

(63) Continuation of application No. 17/449,137, filed on Sep. 28, 2021, now Pat. No. 12,085,942.

(51) Int. Cl.
*G05D 1/00* (2024.01)

(52) U.S. Cl.
CPC .................................. *G05D 1/0214* (2013.01)

(58) Field of Classification Search
None
See application file for complete search history.

(56) References Cited

U.S. PATENT DOCUMENTS

| | | | |
|---|---|---|---|
| 7,584,020 | B2 | 9/2009 | Bruemmer et al. |
| 8,386,078 | B1 | 2/2013 | Hickman et al. |
| 10,089,419 | B2 | 10/2018 | Michalke et al. |
| 10,338,591 | B2 | 7/2019 | Baalke et al. |
| 2008/0009966 | A1 | 1/2008 | Bruemmer et al. |
| 2016/0271795 | A1 | 9/2016 | Vicenti |
| 2022/0066456 | A1 | 3/2022 | Ebrahimi Afrouzi et al. |

FOREIGN PATENT DOCUMENTS

DK 2952993 T3 7/2018

*Primary Examiner* — Jason Holloway
*Assistant Examiner* — Bryant Tang
(74) *Attorney, Agent, or Firm* — McDonnell Boehnen Hulbert & Berghoff LLP

(57) ABSTRACT

A method includes receiving one or more past trajectories navigated by a robotic device in an environment, wherein the one or more past trajectories are associated with initial environmental sensor data and one or more obstacle detection heuristics. The method also includes determining, based at least on subsequent environmental sensor data, one or more updated obstacle detection heuristics. The method further includes determining, based on the one or more updated obstacle detection heuristics and the initial environmental sensor data, one or more predicted drivable areas in the environment. The method additionally includes, based on the one or more predicted drivable areas including the one or more past trajectories, using the one or more updated obstacle detection heuristics to determine future navigation of the robotic device.

19 Claims, 13 Drawing Sheets

PREVENTING REGRESSIONS IN NAVIGATION DETERMINATIONS USING LOGGED TRAJECTORIES

CROSS-REFERENCE TO RELATED DISCLOSURE

This application is a continuation of U.S. patent application Ser. No. 17/449,137, filed Sep. 28, 2021, which is incorporated herein by reference in its entirety.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

Example embodiments involve methods to prevent regressions in navigation determinations through using logged trajectories. A robotic device may retrieve past trajectories and sensor data to evaluate potential updates to obstacle detection heuristics. Evaluating potential updates may involve predicting drivable areas for past environments encountered by the robotic device. If the predicted drivable areas include past trajectories successfully navigated by the robotic device, then the robotic device may use the updated obstacle detection heuristics as a basis to determine future navigation of the robotic device.

In an embodiment, a method includes receiving one or more past trajectories navigated by a robotic device in an environment, wherein the one or more past trajectories are associated with initial environmental sensor data and one or more obstacle detection heuristics. The method also includes determining, based at least on subsequent environmental sensor data, one or more updated obstacle detection heuristics. The method further includes determining, based on the one or more updated obstacle detection heuristics and the initial environmental sensor data, one or more predicted drivable areas in the environment. The method additionally includes, based on the one or more predicted drivable areas including the one or more past trajectories, using the one or more updated obstacle detection heuristics to determine future navigation of the robotic device.

In another embodiment, a system includes a computing device configured to receive one or more past trajectories navigated by a robotic device in an environment, wherein the one or more past trajectories are associated with initial environmental sensor data and one or more obstacle detection heuristics. The computing device is further configured to determine, based at least on subsequent environmental sensor data, one or more updated obstacle detection heuristics. The computing device is further configured to determine, based on the one or more updated obstacle detection heuristics and the initial environmental sensor data, one or more predicted drivable areas in the environment. The computing device is additionally configured to, based on the one or more predicted drivable areas including the one or more past trajectories, use the one or more updated obstacle detection heuristics to determine future navigation of the robotic device.

In a further embodiment, a non-transitory computer readable medium is provided which includes program instructions executable by at least one processor to cause the at least one processor to perform functions. The functions include receiving one or more past trajectories navigated by a robotic device in an environment, wherein the one or more past trajectories are associated with initial environmental sensor data and one or more obstacle detection heuristics. The functions also include determining, based at least on subsequent environmental sensor data, one or more updated obstacle detection heuristics. The functions further include determining, based on the one or more updated obstacle detection heuristics and the initial environmental sensor data, one or more predicted drivable areas in the environment. The functions additionally include, based on the one or more predicted drivable areas including the one or more past trajectories, using the one or more updated obstacle detection heuristics to determine future navigation of the robotic device.

In a further embodiment, a system is provided that includes means for receiving one or more past trajectories navigated by a robotic device in an environment, wherein the one or more past trajectories are associated with initial environmental sensor data and one or more obstacle detection heuristics. The system also includes means for determining, based at least on subsequent environmental sensor data, one or more updated obstacle detection heuristics. The system further includes means for determining, based on the one or more updated obstacle detection heuristics and the initial environmental sensor data, one or more predicted drivable areas in the environment. The system additionally includes means for, based on the one or more predicted drivable areas including the one or more past trajectories, using the one or more updated obstacle detection heuristics to determine future navigation of the robotic device.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
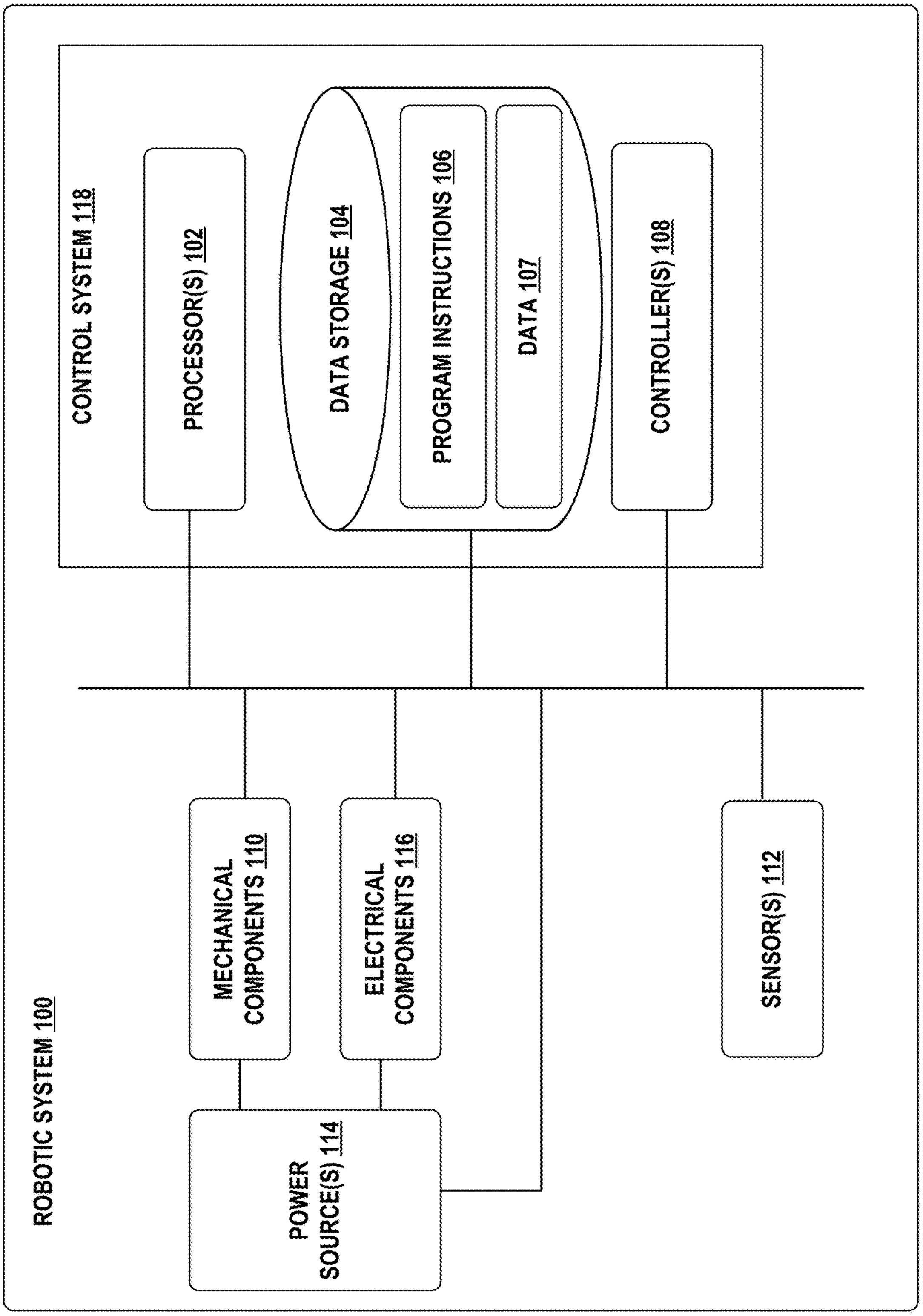
FIG. 1 illustrates a configuration of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

In an example system, a robotic device may navigate an environment through analyzing sensor data using various obstacle detection heuristics. Obstacle detection heuristics may include one or more thresholds that enable obstacle detection from sensor data. For example, the robotic device may collect environmental data from a LIDAR sensor and/or a camera on the robotic device, and the robotic device may use the environmental data to compute the dimensions of an observed obstacle. The dimensions of the observed obstacle may be compared to the obstacle detection heuristics to determine whether the area with the observed obstacle is a drivable area for the robotic device. For instance, the obstacle detection heuristics may indicate that an object with a height of six inches or more is not drivable. If the observed obstacle has a height of five feet, then the area with the observed obstacle may be indicated as not drivable. In contrast, if the observed obstacle has a height of five inches, then the area with the observed obstacle may be indicated as drivable.

Each heuristic may be tuned based on the environment in which the robotic device is operating. For example, a robotic device initially may be tasked with moving objects in an area with many narrow openings and small objects, before the robotic device is subsequently reassigned to a different area with large openings and large objects. In the area with small objects, the heuristic describing the minimum distance between objects needed for the robotic device to successfully pass through may be set to the width of the robotic device to accommodate the narrow openings in the environment. However, when the robotic device changes areas, this heuristic describing the minimum distance between objects may be adjusted to a larger threshold to accommodate the large objects being moved in the large open areas, since the large objects may have a width greater than the robotic device.

In practice, obstacle detection heuristics may include a large set of heuristics, including minimum/maximum distance between objects, angles at which the object meets the floor, the amount of time that has passed since the last LIDAR scan, and so on. A combination of these heuristics may be used to determine the driveability of an area, and as mentioned above, each heuristic may be tuned based on the situation. Because a robotic device may operate in a variety of environments and navigation may be tuned on a very large set of obstacle detection heuristics, manually tuning these heuristics may be difficult and tedious.

Further, tuning obstacle detection heuristics based solely on a new environment may cause regressions in robotic device behavior if the robotic device happens to return to an old environment. For example, a robotic device that moves objects may be relocated from an environment with large openings and large objects to an environment with narrow openings and small objects. The obstacle detection heuristics may be tuned to operate in the more open space (e.g., a heuristic describing the minimum distance between objects may increase in value to accommodate the larger objects). However, if the robotic device moves back into the less open space, then the robotic device may have difficulty detecting any drivable paths because the obstacle detection heuristics were tuned to a more open environment.

Provided herein are methods to systematically determine driveability and prevent regressions in robotic device navigation through quantifying the effect of algorithmic changes including updated obstacle detection heuristics. Namely, past environmental sensor data that were collected by the robotic device for determining driveability and the respective trajectories through which the robotic device successfully navigated may be used as a basis to evaluate the updated obstacle detection heuristics. Because the trajectories through which the robotic device drove successfully are assumed to be drivable trajectories, updated obstacle detection heuristics may be evaluated based on the environmental sensor data that was collected in determining these trajectories to quantify the amount of degradation to the results obtained by the updated obstacle detection heuristics.

In some examples, the robotic device may collect LIDAR data in the form of 3-dimensional (3D) point clouds to determine driveability. The 3D point cloud may be segmented and an occupancy map may be generated based on the segmented 3D point cloud. Segmentation of the 3D point cloud and generation of the occupancy map may depend heavily on heuristics, which are collectively referred to as obstacle detection heuristics herein. The occupancy map may include cells that represent areas in the environment with each cell indicating whether the respective area is drivable or not. The obstacle detection heuristics may be adjusted to generate a more accurate occupancy map and/or to better segment the 3D point cloud, which may also ultimately be used to generate a more accurate occupancy grid.

The obstacle detection heuristics may be tuned in a variety of ways. For example, an operator may manually tune the obstacle detection heuristics periodically when the robotic device changes environments. Alternatively, the obstacle detection heuristics may be automatically tuned using an optimization framework, such as Google Vizier. Based on the environmental sensor data and drivable trajectories on the respective areas that were indicated to be drivable, the optimization framework may optimize the obstacle detection heuristics to thresholds that optimize driveability determinations. For example, the optimization framework may be an algebraic equation, mathematical formula, and/or algorithm that is a function of the obstacle detection heuristics and the collected environmental sensor data. Further, the optimization framework may be a machine learning model that takes sensor data and/or past obstacle detection heuristics as an input and outputs updated obstacle detection heuristics.

In some examples, tuning of the obstacle detection heuristics may only be based on more recent environmental sensor data. Updating the obstacle detection heuristics using a smaller set of data may be easier for an operator when done manually and may consume lower computation times when done using an optimization framework. However, the obstacle detection heuristics may then not reflect conditions in past environments.

The updated obstacle detection heuristics may thus be evaluated based on past trajectories successfully navigated by the robotic device. The past trajectories of the robotic device and the respective collected environmental sensor data may have been stored in a database on a server or in the robotic device and the updated obstacle detection heuristics may be evaluated on at least a subset of these past trajectories. For example, if the past trajectories of the robotic device and the respective collected environmental sensor data is stored in a database on a server, the robotic device may retrieve a set of randomly selected samples from the database to evaluate the updated obstacle detection heuristics. Similarly, if the past trajectories of the robotic device and the respective environmental sensor data are stored in a database on the robotic device, the stored past trajectories and the respective environmental sensor data may only be a subset of the past trajectories and the respective environmental sensor data.

In some examples, past trajectories may be paths through which the robotic device has navigated previously, and the respective environmental sensor data may have been used to determine those trajectories. By using environmental sensor data and trajectories for environments previously navigated by the robotic device, the updated obstacle detection heuristics may be evaluated based on environmental sensor data representing areas that have been confirmed to be drivable. The environmental sensor data may be evaluated using the updated obstacle detection heuristics to determine predicted drivable areas. If the predicted drivable areas include the stored drivable trajectories, then the updated obstacle detection heuristics may be indicated as usable, and the updated obstacle detection heuristics may then be used to determine future navigation of the robotic device. In contrast, if the predicted drivable areas omit all or at least a predetermined number or portion of the stored drivable trajectories, then the updated obstacle detection heuristics may be indicated as unusable, and optionally updated obstacle detection heuristics may be recomputed.

In some examples, a similar method may be performed with non-drivableable areas. For example, a robotic device may be streaming data to a remote operator that is responsible for halting the robotic device before the robotic device collides with an object or to prevent other potential accidents. The environmental sensor data around these trajectories may also be stored along with the unsuccessful trajectories that describe where the remote operator stopped the robotic device. During further operation, the robotic device may collect additional data which may be used to update the obstacle detection heuristics. The additional data may also be indicative of unsuccessful trajectories. After the obstacle detection heuristics have been updated based on the more recently collected environmental data, the robotic device may evaluate the updated obstacle detection heuristics based on the past unsuccessful trajectories and the respective environmental sensor data. If the predicted non-drivable areas include the stored non-drivable trajectories, then the updated obstacle detection heuristics may be indicated as usable, and the updated obstacle detection heuristics may then be used to determine future navigation of the robotic device. In contrast, if the predicted non-drivable areas omit all or at least a predetermined number or portion of the stored non-drivable trajectories, then the updated obstacle detection heuristics may be indicated as unusable, and the updated obstacle detection heuristics may be recomputed.

This process of evaluating the updated obstacle detection heuristics based on previously collected environmental sensor data may occur periodically. For example, the updated obstacle detection heuristics may be evaluated based on the previously collected environmental sensor data once a day while the robotic device is idle. Additionally or alternatively, the updated obstacle detection heuristics may be evaluated based on the previously collected environmental sensor data whenever the obstacle detection heuristics are updated.

In some examples, the robotic device may be operating in a first environment before moving to a second environment. The robotic device may collect environmental sensor data and traverse trajectories in the first environment, and the updated obstacle detection heuristics may also be tuned based on the first environment. When the robotic device moves to the second environment, the obstacle detection heuristics may no longer be optimal for the second environment. Thus, the obstacle detection heuristics may be updated based on the second environment. However, to ensure that the obstacle detection heuristics do not regress in accuracy for the first environment, the updated obstacle detection heuristics may be evaluated based on the data collected in the first environment. If the predicted drivable paths determined using the updated obstacle detection heuristics include the trajectories of the robotic device in the first environment, or at least a subset thereof, the updated obstacle detection heuristics may be used to determine future navigation of the robotic device.

II. Example Robotic Systems

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Some example implementations involve a robotic system 100 engineered to be low cost at scale and designed to support a variety of tasks. Robotic system 100 may be designed to be capable of operating around people. Robotic system 100 may also be optimized for machine learning. Throughout this description, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller 108 may be a purpose-built embedded device for performing specific operations with one or more subsystems of the robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a requested task, such as to pick up and move an object from one location to another location. Based on this input, control system 118 may perform operations to cause the robotic system 100 to make a sequence of movements to perform the requested task. As another illustration, a control system may receive an input indicating an instruction to move to a requested location. In response, control system 118 (perhaps with the assistance of other components or systems) may determine a direction and speed to move robotic system 100 through an environment en route to the requested location.

Operations of control system 118 may be carried out by processor(s) 102. Alternatively, these operations may be carried out by controller(s) 108, or a combination of processor(s) 102 and controller(s) 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include one or more physical members, such as an arm, an end effector, a head, a neck, a torso, a base, and wheels. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable end effectors or digits that can be replaced or changed as needed or desired. In some implementations, robotic system 100 may include one or more removable or replaceable battery units, control systems, power systems, bumpers, or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In some examples, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of an extendable arm, an end effector, or other mechanical or electrical features of robotic system 100. The data provided by sensor(s) 112 may enable control system 118 to determine errors in operation as well as monitor overall operation of components of robotic system 100.

As an example, robotic system 100 may use force/torque sensors to measure load on various components of robotic system 100. In some implementations, robotic system 100 may include one or more force/torque sensors on an arm or end effector to measure the load on the actuators that move one or more members of the arm or end effector. In some examples, the robotic system 100 may include a force/torque sensor at or near the wrist or end effector, but not at or near other joints of a robotic arm. In further examples, robotic system 100 may use one or more position sensors to sense the position of the actuators of the robotic system. For instance, such position sensors may sense states of extension, retraction, positioning, or rotation of the actuators on an arm or end effector.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to operate in tight spaces may have a relatively tall, narrow body. Further, the body or the other components may be developed using various types of materials, such as metals or plastics. Within other examples, a robot may have a body with a different structure or made of various types of materials.

The body or the other components may include or carry sensor(s) 112. These sensors may be positioned in various locations on the robotic system 100, such as on a body, a head, a neck, a base, a torso, an arm, or an end effector, among other examples.

Robotic system 100 may be configured to carry a load, such as a type of cargo that is to be transported. In some examples, the load may be placed by the robotic system 100 into a bin or other container attached to the robotic system 100. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, robotic system 100 may include various types of appendages, wheels, end effectors, gripping devices and so on. In some examples, robotic system 100 may include a mobile base with wheels, treads, or some other form of locomotion. Additionally, robotic system 100 may include a robotic arm or some other form of robotic manipulator. In the case of a mobile base, the base may be considered as one of mechanical components 110 and may include wheels, powered by one or more of actuators, which allow for mobility of a robotic arm in addition to the rest of the body.

Figure 2:
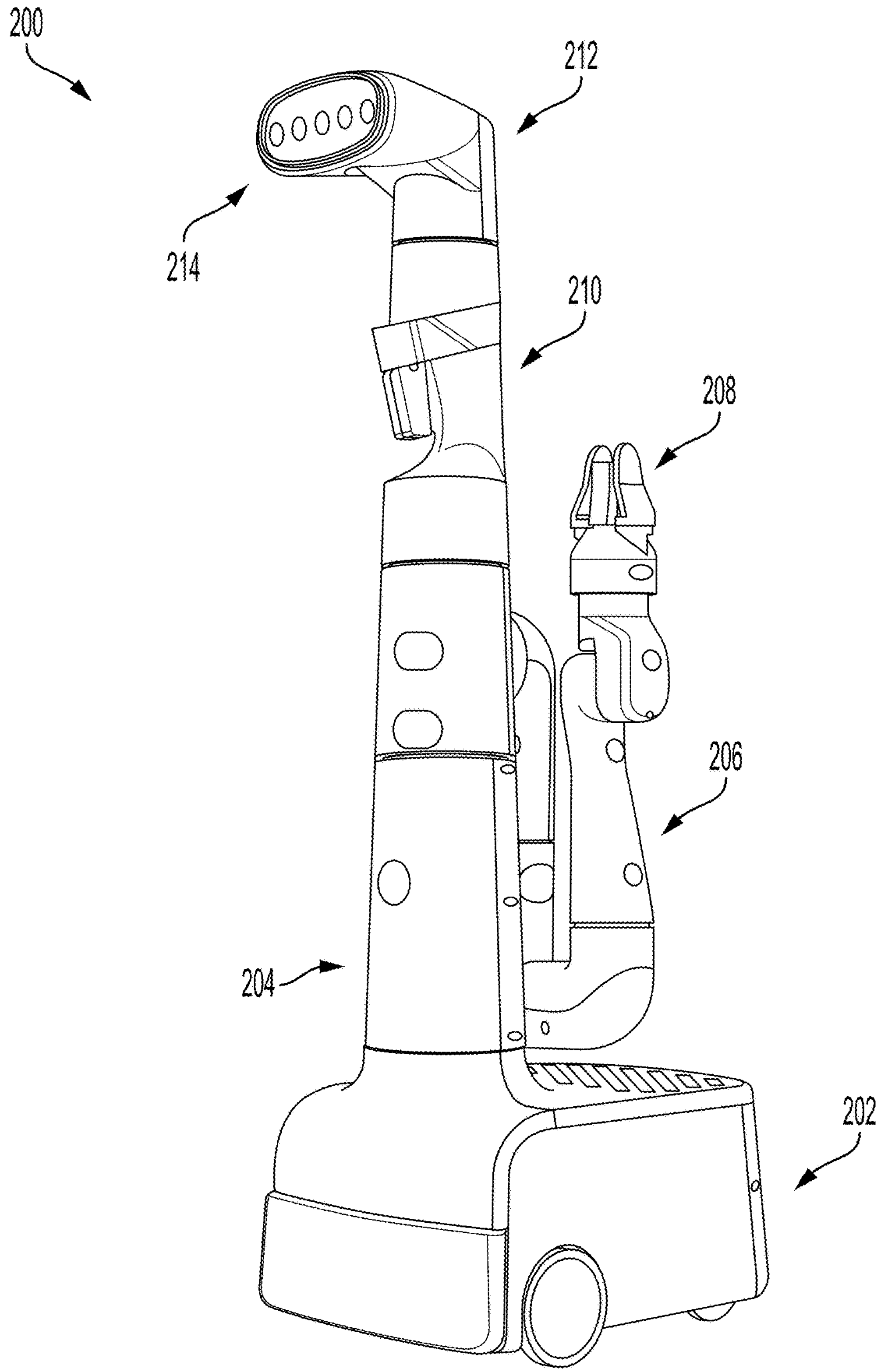
FIG. 2 illustrates a mobile robot, in accordance with example embodiments.
Figure 3:
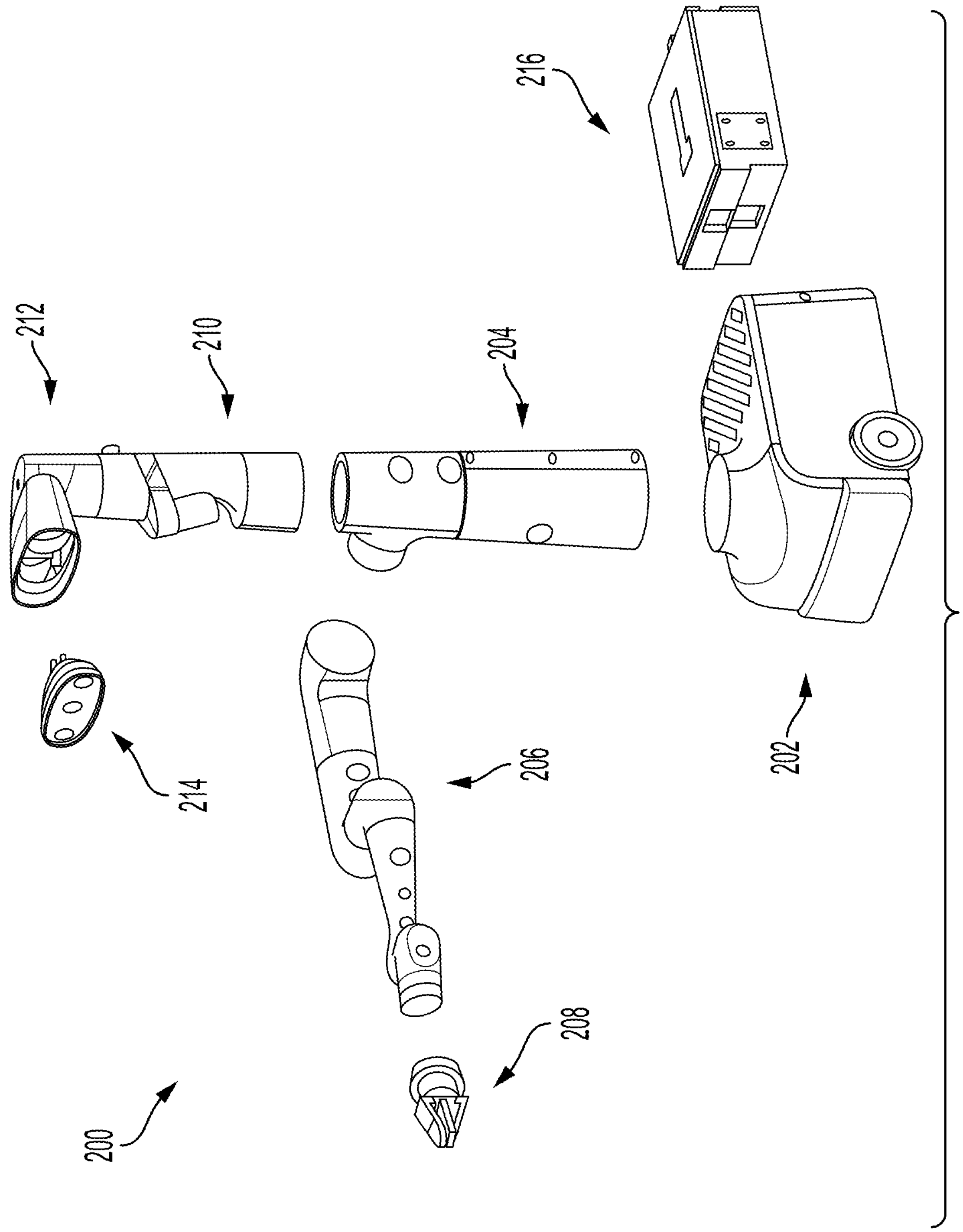
FIG. 3 illustrates an exploded view of a mobile robot, in accordance with example embodiments.

FIG. 2 illustrates a mobile robot, in accordance with example embodiments. FIG. 3 illustrates an exploded view of the mobile robot, in accordance with example embodiments. More specifically, a robot 200 may include a mobile base 202, a midsection 204, an arm 206, an end-of-arm system (EOAS) 208, a mast 210, a perception housing 212, and a perception suite 214. The robot 200 may also include a compute box 216 stored within mobile base 202.

The mobile base 202 includes two drive wheels positioned at a front end of the robot 200 in order to provide locomotion to robot 200. The mobile base 202 also includes additional casters (not shown) to facilitate motion of the mobile base 202 over a ground surface. The mobile base 202 may have a modular architecture that allows compute box 216 to be easily removed. Compute box 216 may serve as a removable control system for robot 200 (rather than a mechanically integrated control system). After removing external shells, the compute box 216 can be easily removed and/or replaced. The mobile base 202 may also be designed to allow for additional modularity. For example, the mobile base 202 may also be designed so that a power system, a battery, and/or external bumpers can all be easily removed and/or replaced.

The midsection 204 may be attached to the mobile base 202 at a front end of the mobile base 202. The midsection 204 includes a mounting column which is fixed to the mobile base 202. The midsection 204 additionally includes a rotational joint for arm 206. More specifically, the midsection 204 includes the first two degrees of freedom for arm 206 (a shoulder yaw J0 joint and a shoulder pitch J1 joint). The mounting column and the shoulder yaw J0 joint may form a portion of a stacked tower at the front of mobile base 202. The mounting column and the shoulder yaw J0 joint may be coaxial. The length of the mounting column of midsection 204 may be chosen to provide the arm 206 with sufficient height to perform manipulation tasks at commonly encountered height levels (e.g., coffee table top and counter top levels). The length of the mounting column of midsection 204 may also allow the shoulder pitch J1 joint to rotate the arm 206 over the mobile base 202 without contacting the mobile base 202.

The arm 206 may be a 7DOF robotic arm when connected to the midsection 204. As noted, the first two DOFs of the arm 206 may be included in the midsection 204. The remaining five DOFs may be included in a standalone section of the arm 206 as illustrated in FIGS. 2 and 3. The arm 206 may be made up of plastic monolithic link structures. Inside the arm 206 may be housed standalone actuator modules, local motor drivers, and thru bore cabling.

The EOAS 208 may be an end effector at the end of arm 206. EOAS 208 may allow the robot 200 to manipulate objects in the environment. As shown in FIGS. 2 and 3, EOAS 208 may be a gripper, such as an underactuated pinch gripper. The gripper may include one or more contact sensors such as force/torque sensors and/or non-contact sensors such as one or more cameras to facilitate object detection and gripper control. EOAS 208 may also be a different type of gripper such as a suction gripper or a different type of tool such as a drill or a brush. EOAS 208 may also be swappable or include swappable components such as gripper digits.

The mast 210 may be a relatively long, narrow component between the shoulder yaw J0 joint for arm 206 and perception housing 212. The mast 210 may be part of the stacked tower at the front of mobile base 202. The mast 210 may be fixed relative to the mobile base 202. The mast 210 may be coaxial with the midsection 204. The length of the mast 210 may facilitate perception by perception suite 214 of objects being manipulated by EOAS 208. The mast 210 may have a length such that when the shoulder pitch J1 joint is rotated vertical up, a topmost point of a bicep of the arm 206 is approximately aligned with a top of the mast 210. The length of the mast 210 may then be sufficient to prevent a collision between the perception housing 212 and the arm 206 when the shoulder pitch J1 joint is rotated vertical up.

As shown in FIGS. 2 and 3, the mast 210 may include a 3D lidar sensor configured to collect depth information about the environment. The 3D lidar sensor may be coupled to a carved-out portion of the mast 210 and fixed at a downward angle. The lidar position may be optimized for localization, navigation, and for front cliff detection.

The perception housing 212 may include at least one sensor making up perception suite 214. The perception housing 212 may be connected to a pan/tilt control to allow for reorienting of the perception housing 212 (e.g., to view objects being manipulated by EOAS 208). The perception housing 212 may be a part of the stacked tower fixed to the mobile base 202. A rear portion of the perception housing 212 may be coaxial with the mast 210.

The perception suite 214 may include a suite of sensors configured to collect sensor data representative of the environment of the robot 200. The perception suite 214 may include an infrared(IR)-assisted stereo depth sensor. The perception suite 214 may additionally include a wide-angled red-green-blue (RGB) camera for human-robot interaction and context information. The perception suite 214 may additionally include a high resolution RGB camera for object classification. A face light ring surrounding the perception suite 214 may also be included for improved human-robot interaction and scene illumination. In some examples, the perception suite 214 may also include a projector configured to project images and/or video into the environment.

Figure 4:
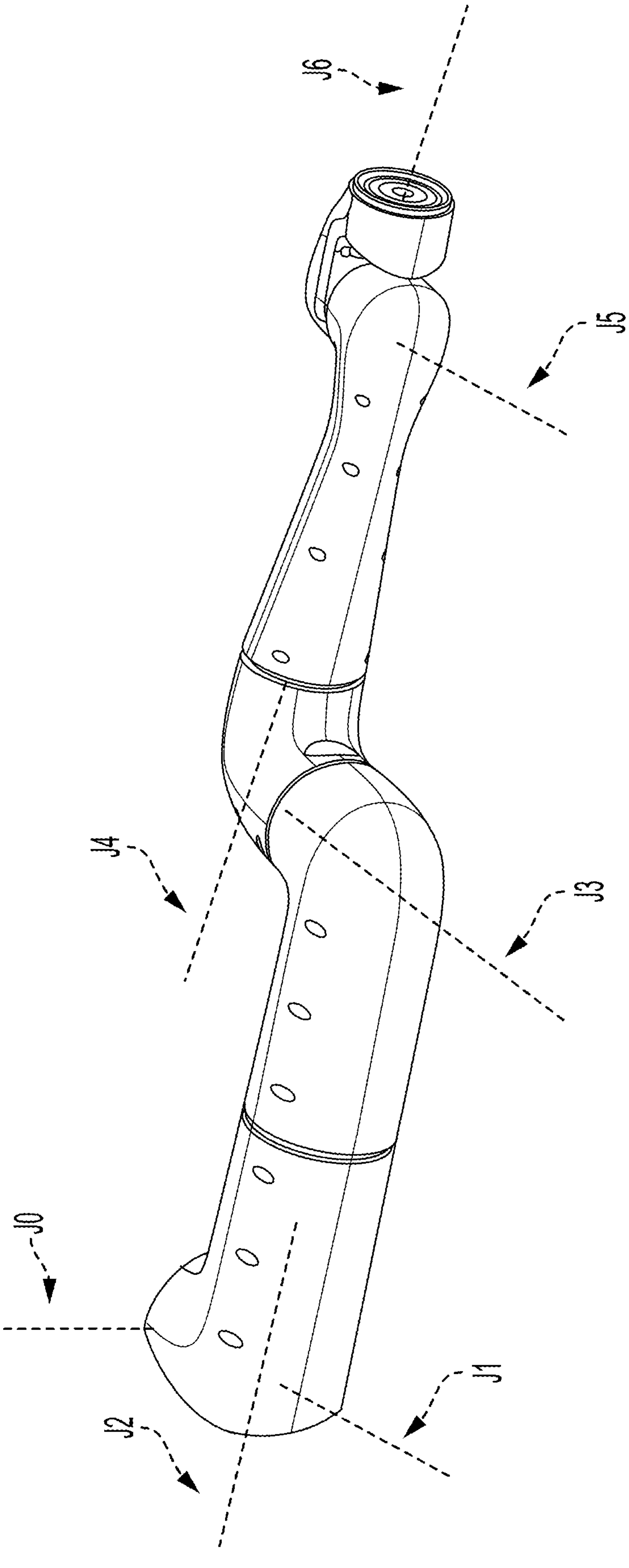
FIG. 4 illustrates a robotic arm, in accordance with example embodiments.

FIG. 4 illustrates a robotic arm, in accordance with example embodiments. The robotic arm includes 7 DOFs: a shoulder yaw J0 joint, a shoulder pitch J1 joint, a bicep roll J2 joint, an elbow pitch J3 joint, a forearm roll J4 joint, a wrist pitch J5 joint, and wrist roll J6 joint. Each of the joints may be coupled to one or more actuators. The actuators coupled to the joints may be operable to cause movement of links down the kinematic chain (as well as any end effector attached to the robot arm).

The shoulder yaw J0 joint allows the robot arm to rotate toward the front and toward the back of the robot. One beneficial use of this motion is to allow the robot to pick up an object in front of the robot and quickly place the object on the rear section of the robot (as well as the reverse motion). Another beneficial use of this motion is to quickly move the robot arm from a stowed configuration behind the robot to an active position in front of the robot (as well as the reverse motion).

The shoulder pitch J1 joint allows the robot to lift the robot arm (e.g., so that the bicep is up to perception suite level on the robot) and to lower the robot arm (e.g., so that the bicep is just above the mobile base). This motion is beneficial to allow the robot to efficiently perform manipulation operations (e.g., top grasps and side grasps) at different target height levels in the environment. For instance, the shoulder pitch J1 joint may be rotated to a vertical up position to allow the robot to easily manipulate objects on a table in the environment. The shoulder pitch J1 joint may be rotated to a vertical down position to allow the robot to easily manipulate objects on a ground surface in the environment.

The bicep roll J2 joint allows the robot to rotate the bicep to move the elbow and forearm relative to the bicep. This motion may be particularly beneficial for facilitating a clear view of the EOAS by the robot's perception suite. By rotating the bicep roll J2 joint, the robot may kick out the elbow and forearm to improve line of sight to an object held in a gripper of the robot.

Moving down the kinematic chain, alternating pitch and roll joints (a shoulder pitch J1 joint, a bicep roll J2 joint, an elbow pitch J3 joint, a forearm roll J4 joint, a wrist pitch J5 joint, and wrist roll J6 joint) are provided to improve the manipulability of the robotic arm. The axes of the wrist pitch J5 joint, the wrist roll J6 joint, and the forearm roll J4 joint are intersecting for reduced arm motion to reorient objects. The wrist roll J6 point is provided instead of two pitch joints in the wrist in order to improve object rotation.

In some examples, a robotic arm such as the one illustrated in FIG. 4 may be capable of operating in a teach mode. In particular, teach mode may be an operating mode of the robotic arm that allows a user to physically interact with and guide robotic arm towards carrying out and recording various movements. In a teaching mode, an external force is applied (e.g., by the user) to the robotic arm based on a teaching input that is intended to teach the robot regarding how to carry out a specific task. The robotic arm may thus obtain data regarding how to carry out the specific task based on instructions and guidance from the user. Such data may relate to a plurality of configurations of mechanical components, joint position data, velocity data, acceleration data, torque data, force data, and power data, among other possibilities.

During teach mode the user may grasp onto the EOAS or wrist in some examples or onto any part of robotic arm in other examples, and provide an external force by physically moving robotic arm. In particular, the user may guide the robotic arm towards grasping onto an object and then moving the object from a first location to a second location. As the user guides the robotic arm during teach mode, the robot may obtain and record data related to the movement such that the robotic arm may be configured to independently carry out the task at a future time during independent operation (e.g., when the robotic arm operates independently outside of teach mode). In some examples, external forces may also be applied by other entities in the physical workspace such as by other objects, machines, or robotic systems, among other possibilities.

Figure 5:
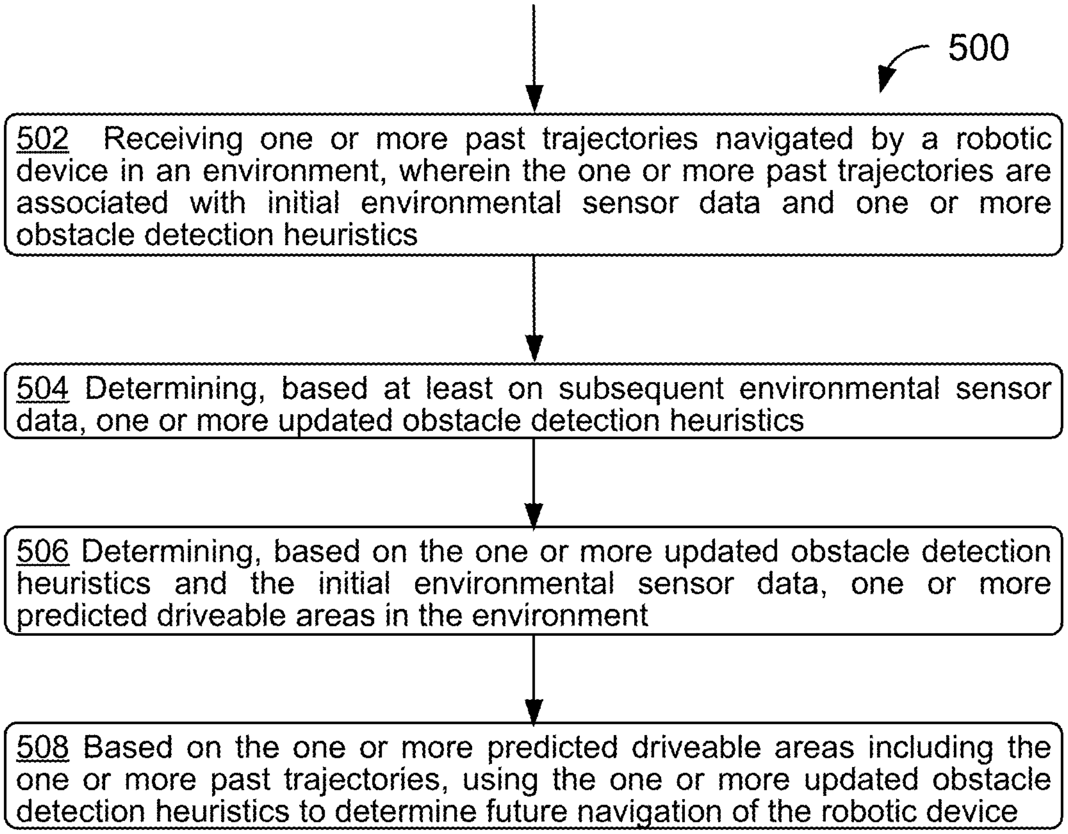
FIG. 5 depicts a method, in accordance with example embodiments.

FIG. 5 is a block diagram of method 500, in accordance with example embodiments. Blocks 502, 504, 506, and 508 may collectively be referred to as method 500. In some examples, method 500 of FIG. 5 may be carried out by a control system, such as control system 118 in robotic system 100. In further examples, method 500 of FIG. 5 may be carried out by a computing device or a server device remote from the robotic device. In still further examples, method 500 may be carried out by one or more processors, such as processor(s) 102, executing program instructions, such as program instructions 106, stored in a data storage, such as data storage 104. Execution of method 500 may involve a robotic device, such as the robotic device illustrated and described with respect to FIGS. 1-4. Further, execution of method 500 may involve a computing device or a server device remote from the robotic device and robotic system 100. Other robotic devices may also be used in the execution of method 500. In further examples, some or all of the blocks of method 500 may be executed by a control system remote from the robotic device. In yet further examples, various blocks of method 500 may be executed by different control systems, located on and/or remote from a robotic device.

Those skilled in the art will understand that the block diagram of FIG. 5 illustrates functionality and operation of certain implementations of the present disclosure. In this regard, each block of the block diagram may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 502, method 500 includes receiving one or more past trajectories navigated by a robotic device in an environment, where the one or more past trajectories are associated with initial environmental sensor data and one or more obstacle detection heuristics. The one or more past trajectories may include paths through which the robotic device has successfully navigated in the past. In some examples, the robotic device may have stored these past trajectories in a server device.

Figure 6A:
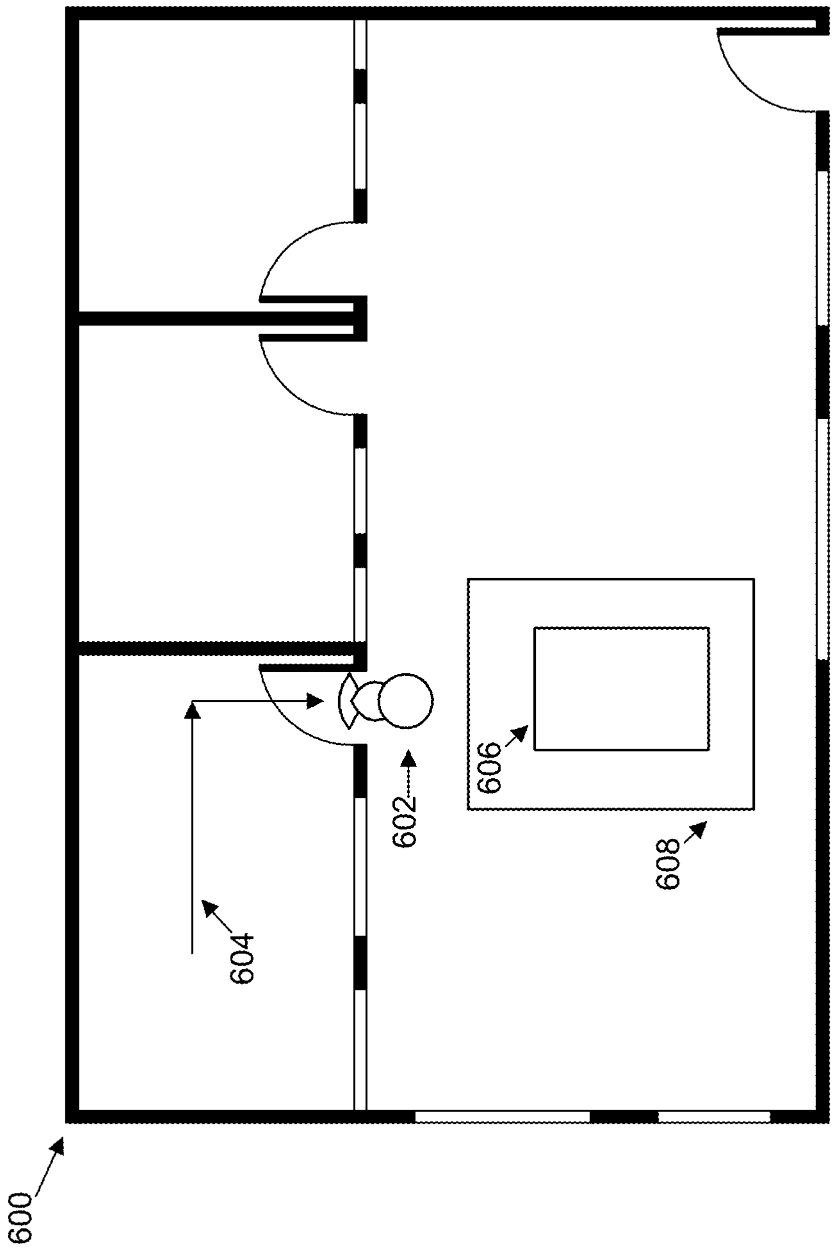
FIG. 6A depicts an environment with a robotic device, in accordance with example embodiments.
Figure 6B:
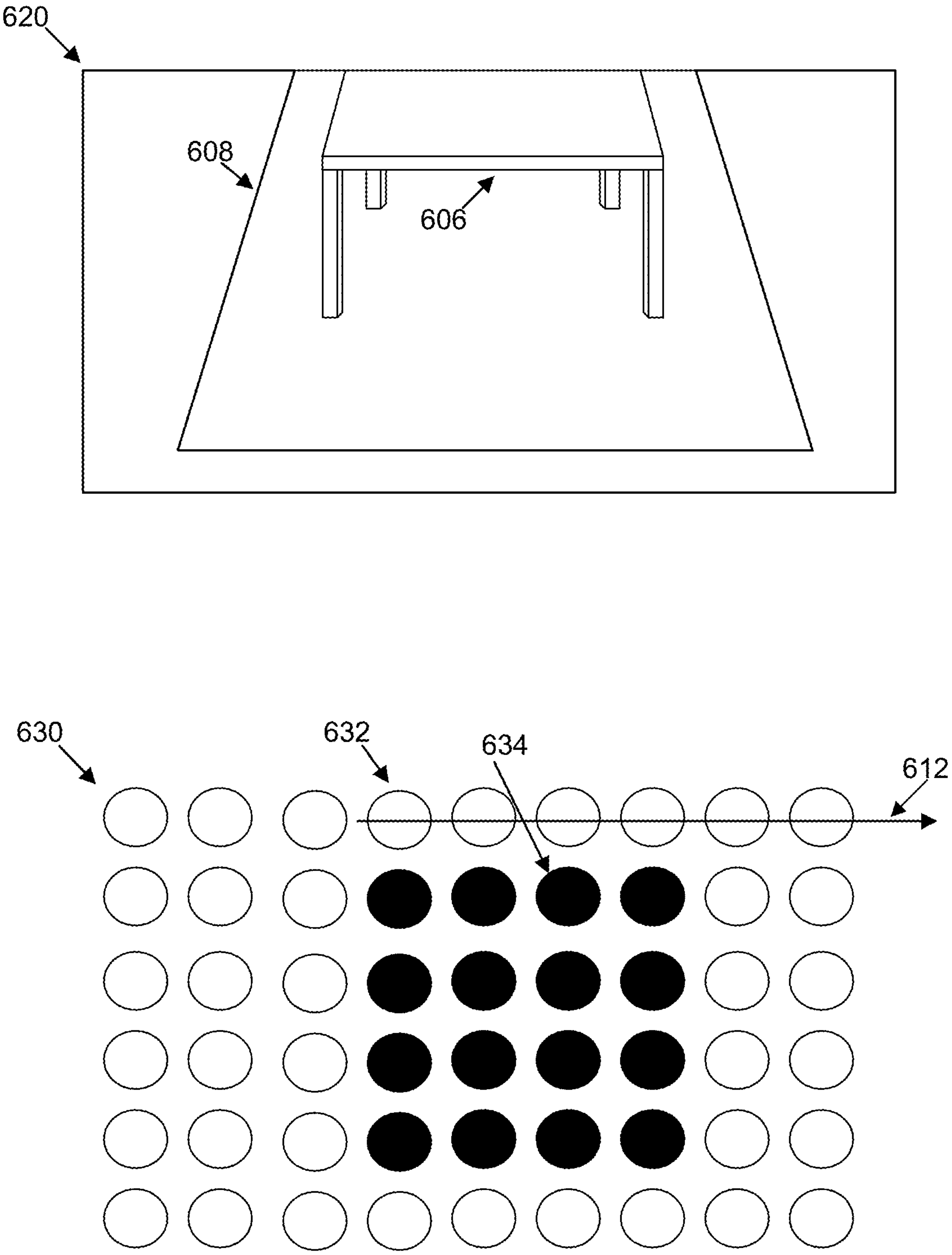
FIG. 6B depicts initial environmental sensor data and an occupancy map, in accordance with example embodiments.

For example, FIG. 6A depicts environment 600 with robotic device 602. Robotic device 602 may have previously traveled in the direction indicated by arrow 604 and may be approaching table 606 on rug 608. FIG. 6B depicts initial environmental sensor data 620 and occupancy map 630 determined based on initial environmental sensor data 620. Robotic device 602 may have collected initial environmental sensor data 620 while at the location indicated in FIG. 6A, with table 606 and rug 608 visible within the field of view of the robotic device sensors. Initial environmental sensor data 620 may have been collected using various sensors on robotic device 602, including LIDAR sensors, cameras, or a combination thereof.

Robotic device 602 may analyze initial environmental sensor data 620 using one or more obstacle detection heuristics to obtain occupancy map 630. As mentioned above, obstacle detection heuristics may include a large set of heuristics, and a combination of heuristics in the set may be used to determine the driveability of an area. Obstacle detection heuristics may be specific to the type of sensor data received and may include obstacle detection heuristics for each step of the data analysis process. For example, obstacle detection heuristics to analyze LIDAR data may include number of rows from the bottom of the LIDAR scan to be ignored, expected duration required to segment a received LIDAR point cloud, expected duration required to prepare a point cloud for input data, and expected duration required to prepare a detected objects message. Further, obstacle detection heuristics may include a minimum number of points in a cluster, a squared Euclidean distance for point cloud clustering, and/or an identifier corresponding to a cluster method. Additionally, the obstacle detection heuristics may include a maximum distance between seed points and a previous region centroid, maximum distance between the seed point normal and previous region centroid normal, maximum plane distance for a candidate point to be considered an inlier, maximum region areas to pass through a verification algorithm, minimum region inlier number to pass through a verification algorithm, and/or minimum number of inliers after which the plane model is re-estimated again.

To detect obstacles in the environment, obstacle detection heuristics may also include variables that contribute to detecting discontinuous boundary points. For example, these obstacle detection heuristics may include minimum range in meters beyond which discontinuous boundary points are computed, maximum range in meters under which discontinuous boundary points are computed, maximum angular velocity difference between two neighboring point normal vectors above which the point is considered discontinuous, maximum z-distance in meters between two neighboring points above which the point is considered discontinuous, and/or maximum ratio of change in z over displacement between two neighboring points to be considered discontinuous.

Obstacle detection heuristics may also include parameters that contribute to determining the driveability of a particular surface. For example, obstacle detection heuristics may include a threshold for the number of plane inliers which should continue to be present for the previous floor to be valid, maximum number of messages with missing floors before resetting the floor surface, minimum number of points in a floor plane, distance in meters that the sensor can detect, angular width of each beam of the sensor, minimum incidence angle of a beam with the floor to be considered a cliff, and/or area of robotic device shadow relative to the robot frame.

Further, obstacle detection heuristics may include heuristics that contribute to voting to determine the occupancy of a particular area. For example, obstacle detection heuristics may include maximum number of seconds for an occupied cell to decay to "unknown" without any new information, maximum possible votes for occupancy, vote total above which an area is considered occupied, amount to change the total vote when the cell is measured as occupied, maximum total vote above which an area is considered unoccupied, amount to change the total vote when a cell is measured as unoccupied, and/or re-weighing points based on the number of neighbors that have the same occupied/unoccupied determination as the area. In some examples, the obstacle detection heuristics may include a threshold indicating a maximum and/or minimum number of votes for an area to be classified as drivable or not drivable. The votes may be determined based on weighing the obstacle detection heuristics such that each property indicated by an obstacle detection heuristic is associated with a number of votes that contribute to the total number of votes. The total number of votes may be compared with the minimum and/or maximum number of votes for an area to be classified as drivable or not drivable.

Through using obstacle detection heuristics, robotic device 602 may determine an occupancy map 630, which may incorporate a plurality of grid cells, each of which indicate a location in the environment and indicate the driveability of each respective location. For example, occupancy map 630 may be a partial top-down view of environment 600 such that shaded area 634 incorporating shaded grid cells indicates areas that are not drivable and unshaded area 632 incorporating unshaded grid cells indicates areas that are drivable. Based on the occupancy map, robotic device 602 may determine possible drivable trajectories and may choose to follow the trajectory indicated by arrow 612.

Figure 6C:
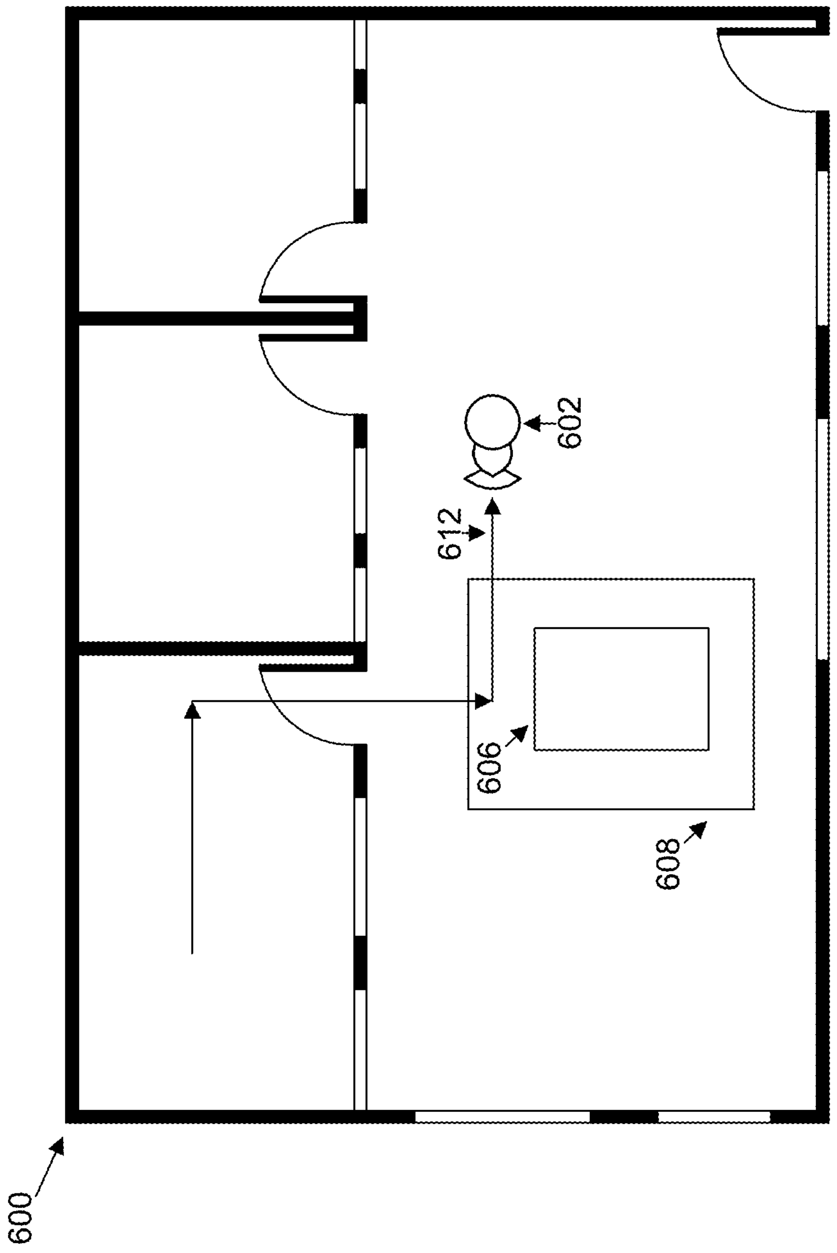
FIG. 6C depicts a robotic device and a trajectory of the robotic device, in accordance with example embodiments.

FIG. 6C depicts robotic device 602 having successfully navigated the trajectory indicated by arrow 612. Successful navigation of the trajectory indicated by arrow 612 may indicate that the trajectory is drivable, and that when obstacle detection heuristics are applied on initial environmental sensor data 620, at least the region through which the trajectory traverses as indicated by arrow 612 may be indicated as drivable. Robotic device 602 may thus store initial environmental sensor data 620 and the past trajectory indicated by arrow 612 in a remote device or in memory of the robotic device. Robotic device 602 may also store a copy of the heuristics used to determine the past trajectory.

Referring back to FIG. 5, at block 504, method 500 includes determining, based at least on subsequent environmental sensor data, one or more updated obstacle detection heuristics. Subsequent environmental sensor data may be collected after the one or more past trajectories and after the initial environmental sensor data have been stored in memory.

In some examples, the subsequent environment sensor data may be collected in a different environment from environment 600 and the values of the updated obstacle detection heuristics may be significantly different from the values of the original obstacle detection heuristics. For example, an original environment, e.g., environment 600, may have wood flooring and a subsequent environment may have carpet flooring. Sensors may detect more texture and/or pick up more noise from carpet flooring, and since this texture/noise may be construed as an occupied area, the obstacle detection heuristic representing the maximum number of votes needed for an area to be considered as unoccupied may increase. As another example, the subsequent environment may be significantly more crowded than environment 600, and as a result, the obstacle detection heuristic representing cell size may decrease to allow for a higher resolution occupancy map.

In some examples, the subsequent environment data may be collected in the same environment as environment 600, but the values of the updated obstacle detection heuristics may nevertheless be different from the values of the original obstacle detection heuristics. For example, environment 600 may be a floor in a university building, and the original obstacle detection heuristics may have been based on environment 600 during the summer when university buildings are generally vacant. However, the updated obstacle detection heuristics may be based on subsequent environmental sensor data when the university is in session and when environment 600 contains continuous and rapid activity, and the values of the updated obstacle detection heuristics may have been changed accordingly. For example, the maximum number of seconds for an occupied cell to decay to being unknown may decrease after having updated the obstacle detection heuristics for the subsequent environmental sensor data collected while the university is in session.

The updated obstacle detection heuristics may be determined in various ways. In some examples, an operator may manually update the obstacle detection heuristics to better fit the subsequent environmental sensor data. For example, an operator may determine that the subsequent environment has carpet rather than the wood flooring of the original environment, and that the carpet flooring is indicating obstacles in areas of the subsequent environment that are not occupied. The operator may then update the obstacle detection heuristics in such a way that the noise caused by the texture in the carpet is less influential in determining occupancy. For example, the operator may increase the maximum number of votes needed for an area to be considered as unoccupied. In some examples, the subsequent environmental data and the obstacle detection heuristics may be sent to an operator controlled device, through which an operator may determine the updated obstacle detection heuristics.

In further examples, a computing device may determine the updated obstacle detection heuristics. For example, the computing device may use an optimization framework such as Google Vizier. An example optimization framework may incorporate the obstacle detection heuristics into a function of the subsequent environmental data. The updated obstacle detection heuristics may be determined through exploring various values of obstacle detection heuristics and choosing those that provide the most accurate results based on the subsequent environmental data, determining local minimums and/or local maximums of the function, among other methods. The computing device carrying out this determination may be the robotic device or a remote server device.

At block 506, method 500 includes determining, based on the one or more updated obstacle detection heuristics and the initial environmental sensor data, one or more predicted drivable areas in the environment. After having determined the updated obstacle detection heuristics, the robotic device may determine whether the updated obstacle detection heuristics contribute to a regression in performance by evaluating the updated obstacle detection heuristics on the initial environmental sensor data.

Figure 7A:
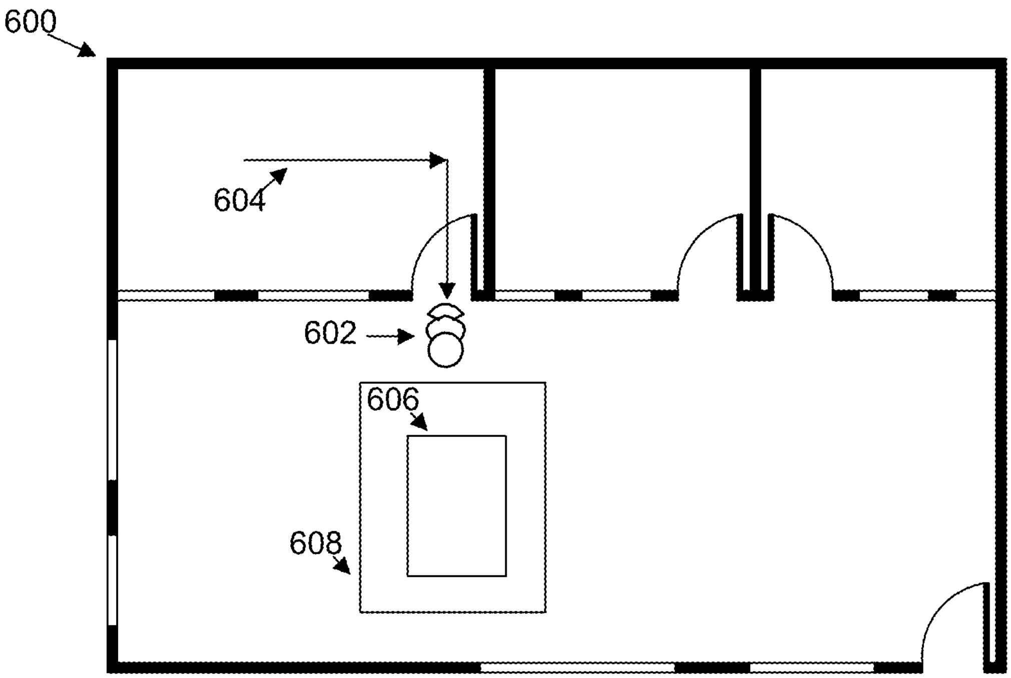
FIG. 7A depicts a robotic device in an environment and initial environmental sensor data, in accordance with example embodiments.
Figure 7A:
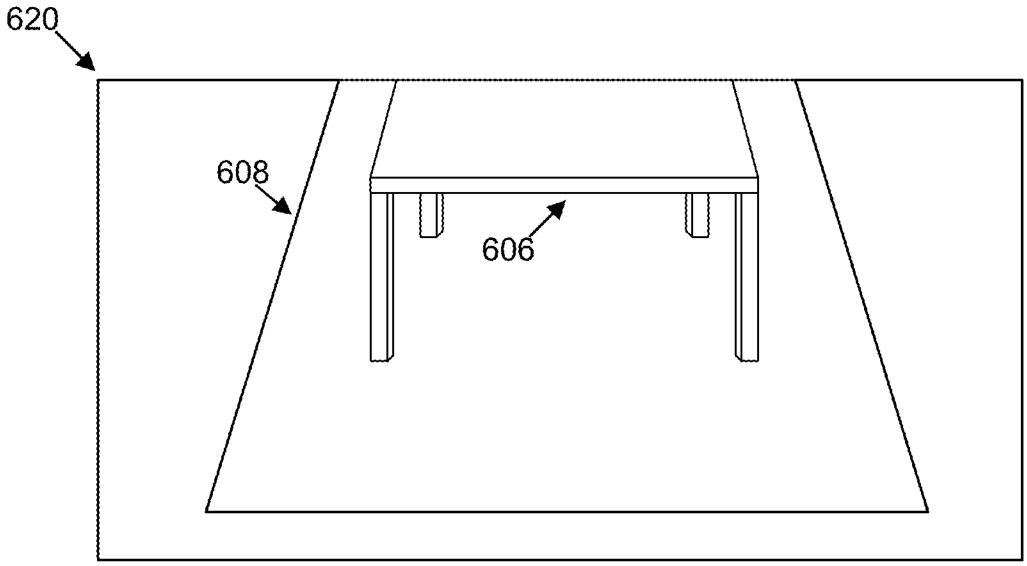

FIG. 7A depicts robotic device 602 in environment 600 and initial environmental sensor data 620 collected by robotic device 602. In some examples, a robotic device, having determined updated obstacle detection heuristics, may request and receive initial environmental sensor data 620 with the one or more past trajectories navigated by the robotic device in the environment. The robotic device may apply the updated obstacle detection heuristics to the received initial environmental sensor data 620 to obtain an occupancy map.

Figure 7B:
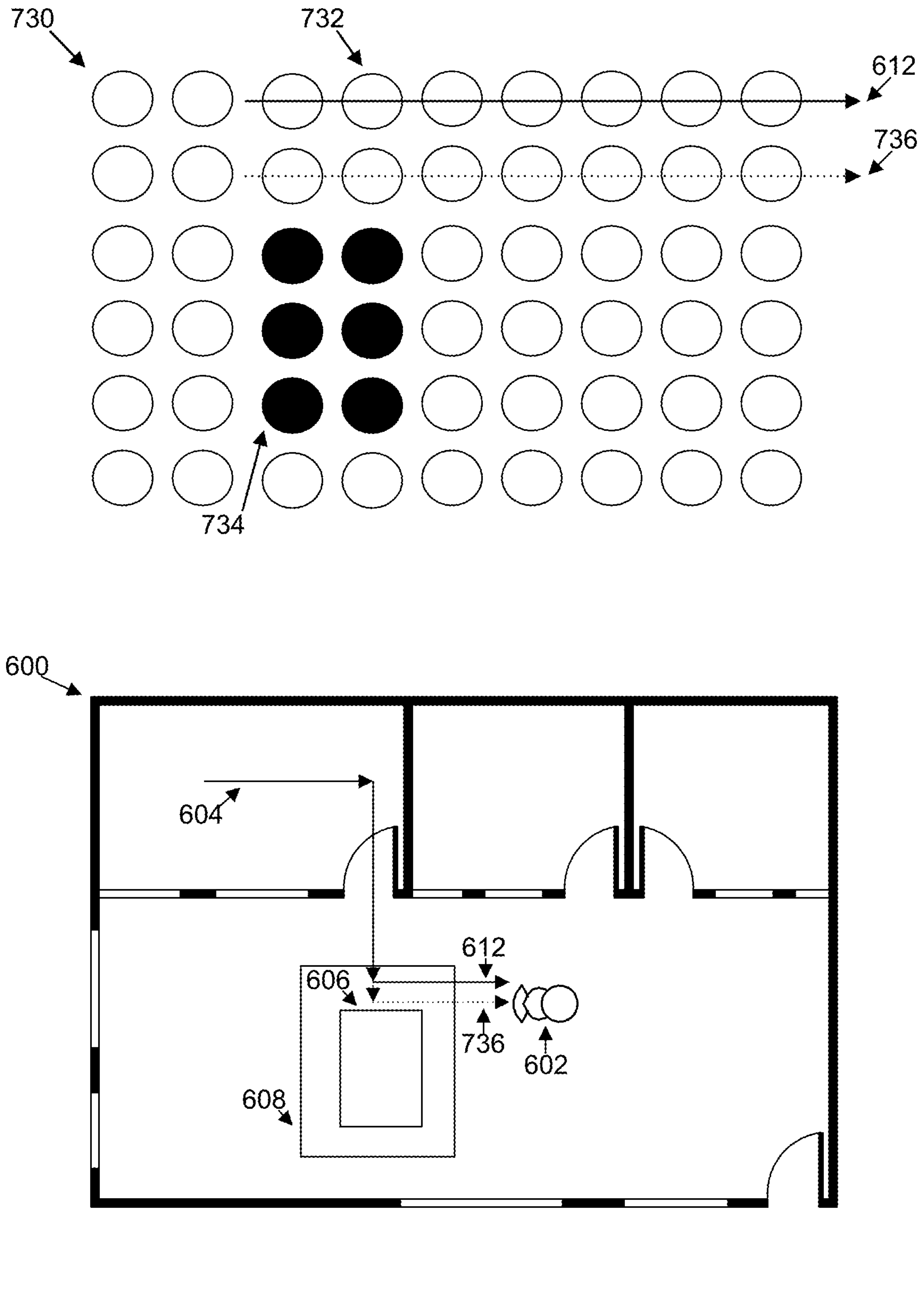
FIG. 7B depicts an occupancy map and trajectories navigated by a robotic device, in accordance with example embodiments.

FIG. 7B depicts past occupancy map 730 of environment 600 and trajectories navigated by robotic device 602. Past occupancy map 730 may have been obtained through applying the updated obstacle detection heuristics to initial environmental sensor data 620. Shaded area 734 may indicate areas of environment 600 that are predicted to be not drivable (e.g., representing table 606) and unshaded area 732 may indicate areas of environment 600 that are predicted to be drivable.

Referring back to FIG. 5, at block 508, method 500 includes based on the one or more predicted drivable areas including the one or more past trajectories, using the one or more updated obstacle detection heuristics to determine future navigation of the robotic device. From predicted drivable areas indicated by unshaded area 732 of FIG. 7B, the robotic device may determine if the predicted drivable areas of past occupancy map 730 include the one or more past trajectories. For sensor data 620 collected in environment 600, the one or more past trajectories may include arrow 612. Accordingly, the robotic device may conclude that the updated obstacle detection heuristics did not cause regression in performance and use the updated obstacle detection heuristics for future navigation of the robotic device. For example, robotic device 602 may navigate in the trajectory indicated by arrow 736. In some examples, after determining that the one or more predicted drivable areas of past occupancy map 730 include the one or more past trajectories, the updated obstacle detection heuristics may be stored in place of the original obstacle detection heuristics to be used for future navigation of the robotic device.

Figure 7C:
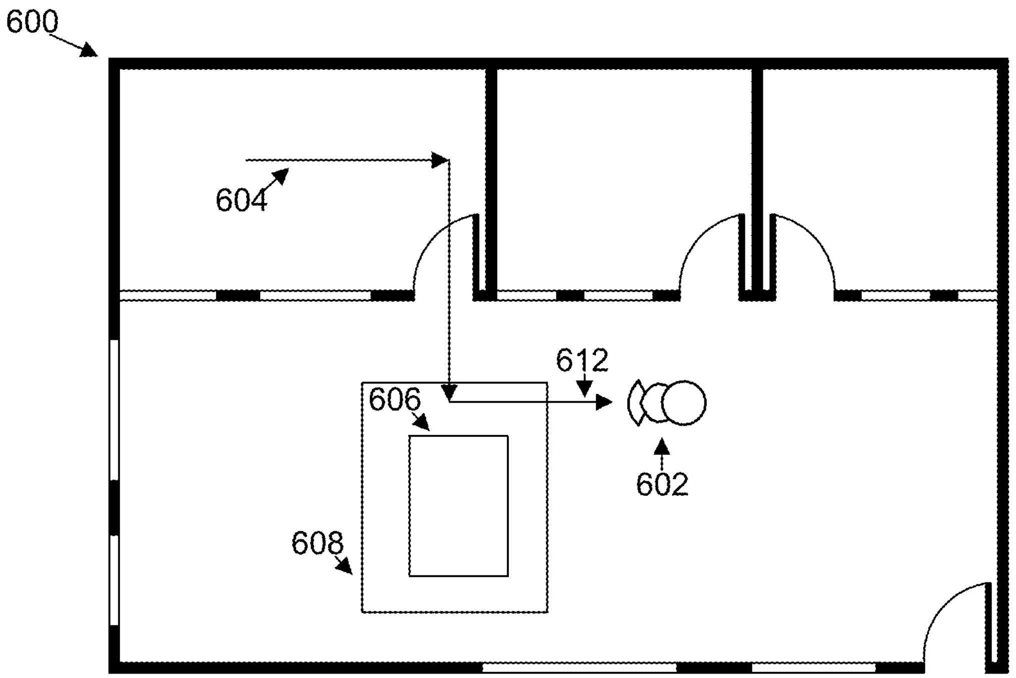
FIG. 7C depicts a robotic device in an environment and an occupancy map, in accordance with example embodiments.
Figure 7C:
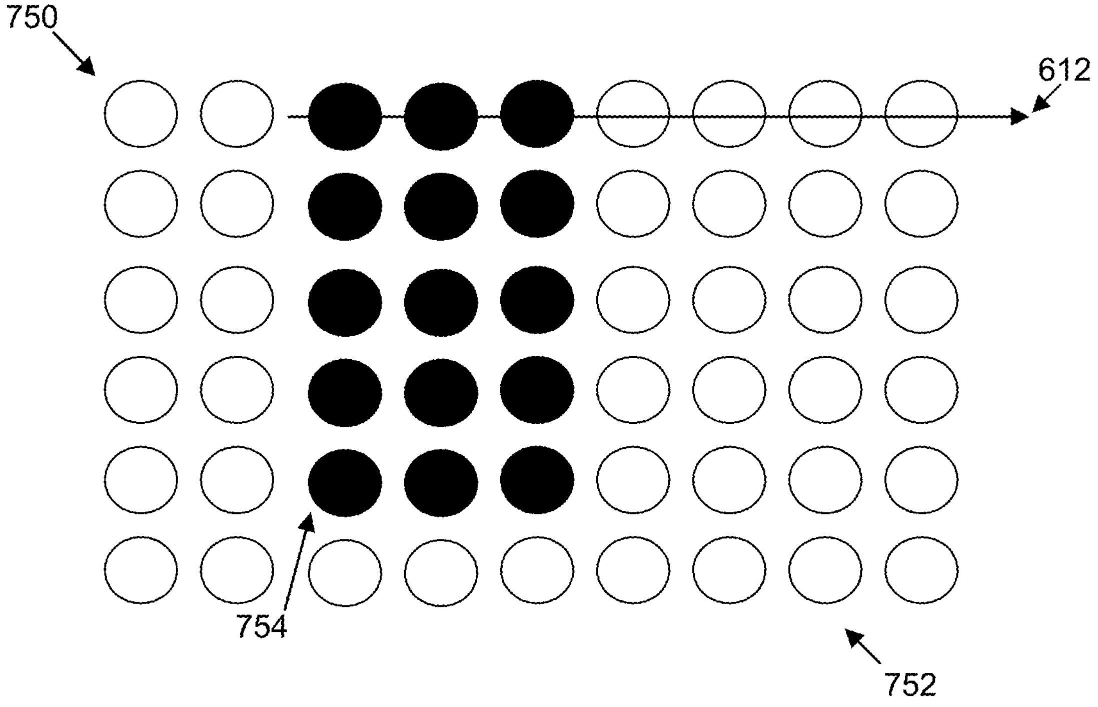

Additionally or alternatively, the one or more predicted drivable areas may be determined to not include the one or more past trajectories, and based on this determination, the updated obstacle heuristics may not be used to determine future navigation of the robotic device. FIG. 7C depicts robotic device 602 navigating in environment 600 having traversed the trajectory indicated by arrow 612 and past occupancy map 750. Robotic device 602 may have navigated through the trajectory indicated by arrow 612 before the updated obstacle detection heuristics were determined. The updated obstacle detection heuristics may be applied on the sensor data collected from environment 600 (e.g., sensor data 620 of FIG. 7A) to determine past occupancy map 750. Past occupancy map 750 may be a partial top-down view of environment 600 and incorporate binary grid cells that indicate the driveability of an area. For example, past occupancy map 750 may include unshaded area 752 incorporating binary grid cells that indicate that the area is drivable and shaded area 754 incorporating binary grid cells that indicate that the area is non-drivable. Arrow 612 may indicate a trajectory in the environment where robotic device 602 has traversed previously. Since the determined drivable area does not include the past trajectory of robotic device 602 as indicated by arrow 612, the updated obstacle detection heuristics may be determined to cause regression in performance. As a result, the original obstacle detection heuristics (e.g., those used when the trajectory indicated by arrow 612 was indicated or a previous version of the obstacle detection heuristics) may be used to determine future navigation of robotic device 602 in lieu of the updated obstacle detection heuristics.

Figure 8A:
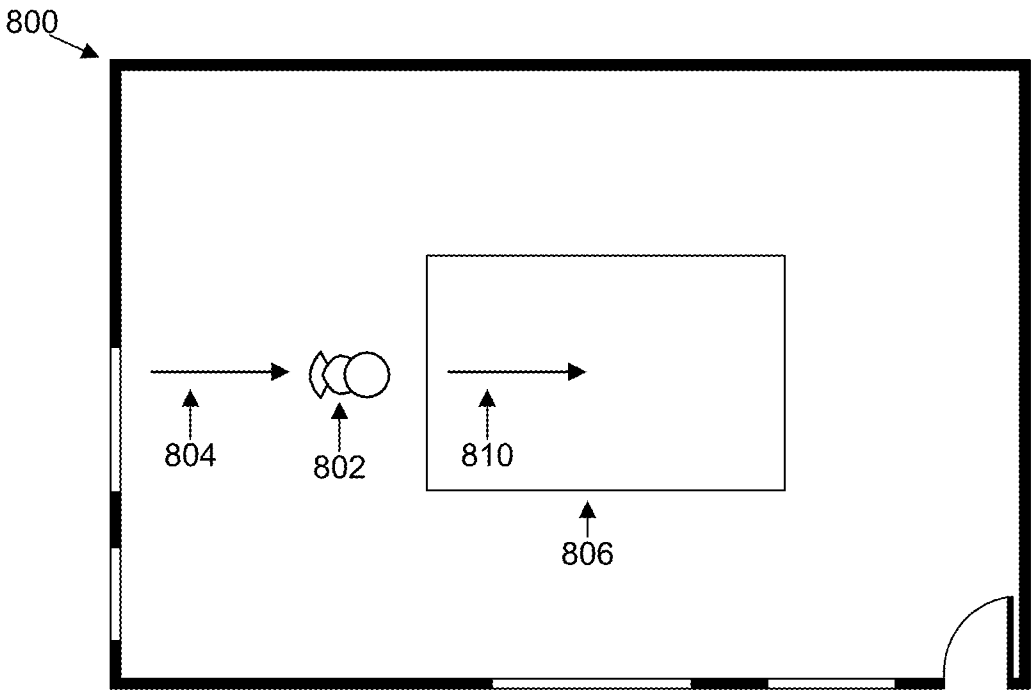
FIG. 8A depicts a robotic device in an environment and sensor data collected by the robotic device, in accordance with example embodiments.
Figure 8A:
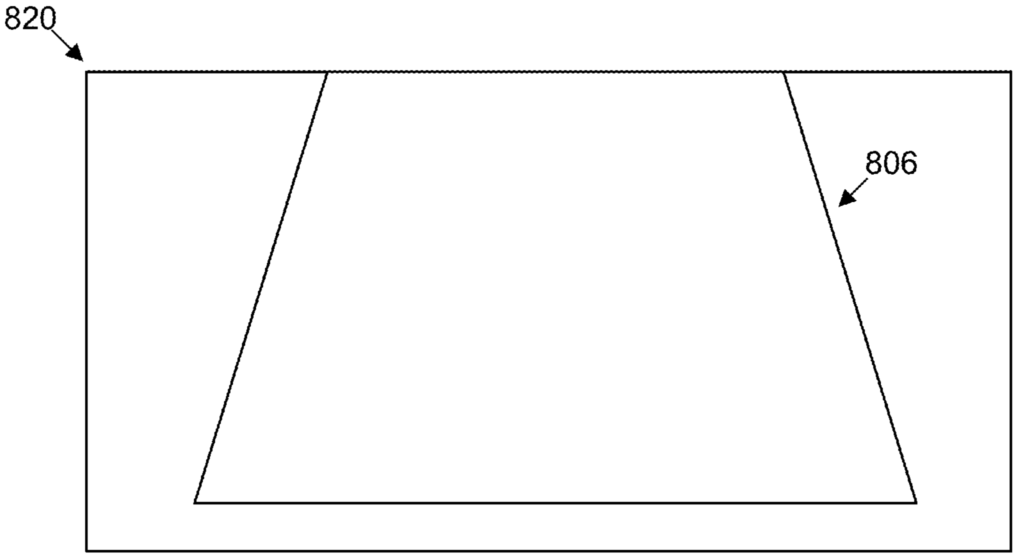

In some examples, a process may be applied to determine areas that are not drivable as well or instead. FIG. 8A depicts robotic device 802 in environment 800 and sensor data 820 collected by robotic device 802. Robotic device 802 may be navigating along the trajectory indicated by arrow 804. Based on the present obstacle detection heuristics, robotic device 802 may determine that the trajectory indicated by arrow 810 is a drivable trajectory and thus may be intending to continue in the direction as indicated by arrow 810. While robotic device 802 is navigating along the trajectory indicated by arrow 804 and continuing along the trajectory indicated by arrow 810, robotic device 802 may collect and send obtained sensor data 820 to a remote operator. The sensor data may be compiled in a format viewable by the remote operator. Sensor data 820 may be displayed to an operator through a remote device.

Based on sensor data 820, an operator may determine that the trajectory indicated by arrow 810 is not drivable, and the operator may send a message to the robotic device 802 to stop, thereby preventing robotic device 802 from traversing along the trajectory indicated by arrow 810 and onto rug 806. In some examples, robotic device 802 may then store the trajectory indicated by arrow 810 where robotic device 802 intended to go as an unsuccessful trajectory.

The robotic device may continue to operate in environment 800 or in another environment, and the subsequent environmental sensor data collected in these environments may be used to determine one or more updated obstacle detection heuristics, as described above. After having determined the one or more updated obstacle detection heuristics, the robotic device may apply the one or more updated obstacle detection heuristics to sensor data 820 to determine one or more predicted undrivable (and perhaps drivable) areas in the environment.

Figure 8B:
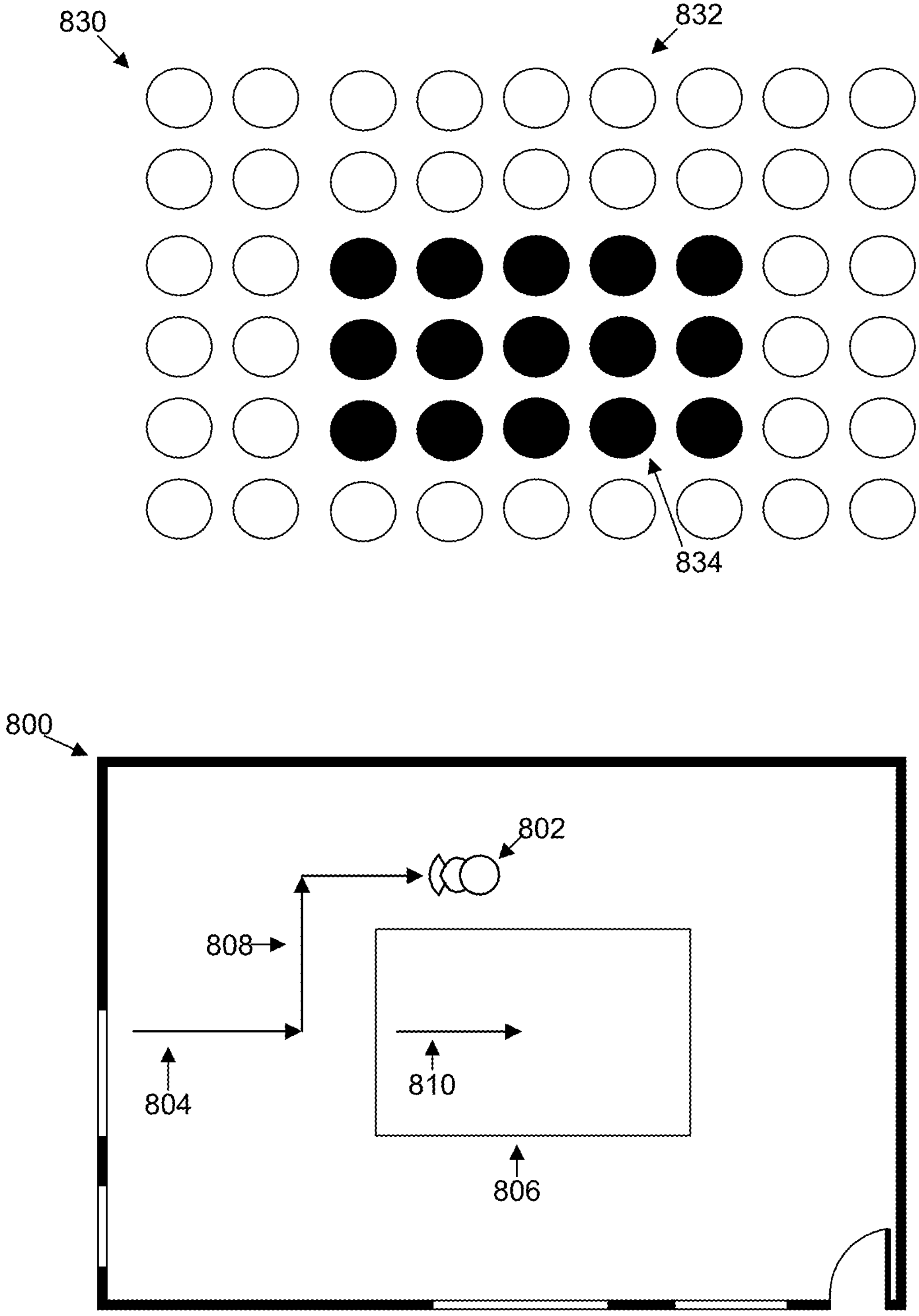
FIG. 8B depicts an occupancy map and a robotic device in an environment, in accordance with example embodiments.

In some examples, the robotic device may obtain an occupancy map because of applying the one or more updated obstacle detection heuristics to sensor data 820, and the occupancy map may be used to determine navigation for the robotic device. FIG. 8B depicts occupancy map 830 and environment 800 in which robotic device 802 is navigating. Occupancy map 830 may be a partial top-down view of environment 800 and each shaded binary grid cell of occupancy map 830 may represent an occupied area and each unshaded binary grid cell of occupancy map 830 may represent an unoccupied area. Thus, shaded area 834 may represent an occupied area and unshaded area 832 may represent an unoccupied area. Arrow 810 may represent the unsuccessful trajectory in environment 800 that robotic device 802 only partially traversed. Since the undrivable areas determined using the updated obstacle detection heuristics include the unsuccessful trajectory in environment 800 as indicated by arrow 810, the updated obstacle detection heuristics may be used to determine further navigation of the robotic device.

For example, environment 800 of FIG. 8B depicts a situation similar to that presented in FIG. 8A. After navigating along the trajectory indicated by arrow 804, robotic device 802 may have evaluated the possible trajectories through using sensor data similar to sensor data 820 and through using the updated obstacle detection heuristics. Through this analysis, robotic device 802 may have obtained an occupancy map similar to occupancy map 830, and based on this occupancy map, robotic device 802 may decide to navigate along the trajectory indicated by arrow 808 to avoid rug 806.

In some examples, the past trajectories of the robotic device may be determined in multiple environments, perhaps by multiple robotic devices. For example, robotic device 602 may navigate in environment 600 and environment 800. Robotic device 602 may store the trajectories through which it has traversed and the associated sensor data and the obstacle detection heuristics used to determine the trajectories. Robotic device 602 may evaluate any updated obstacle detection heuristics on this stored set of trajectories determined from environment 600 and environment 800. Additionally, the past trajectories of the robotic device may be determined in multiple environments. For example, robotic device 602 may operate in environment 600 and send past traversed trajectories and environmental data associated with the past traversed trajectories to a server device. Robotic device 802 may operate in environment 800 and may send its past traversed trajectories and environmental data associated with its past traversed trajectories to the same server device. Either robotic device may then evaluate any updated obstacle detection heuristics based on this set of trajectories determined from both environment 600 and environment 800.

In some examples, the trajectories used to evaluate updated obstacle detection heuristics may be a subset of the stored past trajectories. The robotic device may select a subset of the stored past trajectories navigated by the robotic device, which may enable more efficient updating of the obstacle detection heuristics. Selecting a subset of the stored past trajectories may involve selecting a particular subset of trajectories that are specific to an environment, to a robotic device, to a time of day, among others.

In some examples, a robotic device may update the obstacle detection heuristics periodically as it operates and the updated obstacle detection heuristics may also be evaluated periodically. For example, the obstacle detection heuristics may be updated every day and the updated obstacle detection heuristics may be evaluated every week. Additionally or alternatively, the obstacle detection heuristics may be evaluated after a threshold number of obstacle detection heuristic updates have been made.

Further, updated obstacle detection heuristics may be evaluated after the robotic device determines a material change in the environment. For example, the robotic device may classify each environment in which it operates and if a new environment has a different classification than the previous environment, the robotic device may evaluate any updated obstacle detection heuristics on past data. Additionally or alternatively, the robotic device may classify received sensor data to detect material changes in the environment. For example, the robotic device may classify sensor data received in the morning as "uncrowded," sensor data received in the afternoon as "crowded," and sensor data received in the evening as "uncrowded." Upon detection of the "uncrowded" evening sensor data, the robotic device may evaluate the updated obstacle detection heuristics for any regression.

As mentioned above, drivable and/or undrivable areas may be represented by occupancy maps that include binary grid cells indicating drivability (or lack thereof) and corresponding to locations in the environment. Past occupancy maps determined by applying updated obstacle detection heuristics to past sensor data may be used as a basis to determine whether to use the updated obstacle detection heuristics. In particular, the past occupancy maps may be evaluated to determine whether the drivable areas of the past occupancy maps cover the past trajectories navigated by the robotic device.

In some examples, the robotic device may quantify the impact of updating the obstacle detection heuristics. Specifically, the robotic device may determine a number of false undrivable areas and determine if the number of false undrivable areas is below a threshold number such that using the updated obstacle detection heuristics in place of the original obstacle detection heuristics may be justified. A false undrivable area may be represented by a false negative binary cell in a past occupancy map and may represent an area in the environment that was indicated to be not drivable. However, based on past trajectories, the robotic device may determine that the area in the environment is drivable. If the number of false negative binary grid cells are below a threshold number, the updated obstacle detection heuristics may nevertheless be used, since the inaccuracy may be small compared to the improvement in performance. Additionally or alternatively, if the number of false negative binary grid cells are above a threshold, then the original obstacle detection heuristics may be used in place of the updated obstacle detection heuristics because any improvement in performance may be outweighed by the regression in accuracy.

In some examples, the number of false driveable areas in the past occupancy maps may be compared to a threshold number to determine whether to use the original obstacle detection heuristics or the updated obstacle detection heuristics. For example, a false drivable area may be represented by a false positive binary cell, which may indicate an area in the environment that was indicated to be drivable. However, based on past trajectories, the robotic device may determine that the area in the environment is not drivable (e.g., the robotic device was stopped by an operator before having traversed the area). If the number of false positive binary grid cells are below a threshold, the updated obstacle detection heuristics may nevertheless be used, because the small regression in performance may be small compared to the improvement in performance. Additionally or alternatively, if the number of false positive binary grid cells are above a threshold, then the original obstacle detection heuristics may be used in place of the updated obstacle detection heuristics because the regression in performance may outweigh the improvement.

In some examples, the trajectories used to evaluate the updated obstacle detection heuristics may include one or more other past trajectories navigated by one or more other moving elements in the environment. The robotic device may use these other past trajectories as a basis to evaluate the updated obstacle detection heuristics. Namely, if a moving element traverses a certain trajectory, the robotic device may infer that the traversed trajectory of the moving element is also traversable for itself. Alternatively, if a moving element is unsuccessful in traversing a certain trajectory (e.g., gets stuck, an operator stops the moving element, etc.), the robotic device may infer that the partially traversed trajectory of the moving element is also not traversable for itself. In some examples, the moving element may be in an environment in which the robotic device is traversing, and the robotic device may determine predicted drivable/undrivable trajectories using environmental data stored on the robotic device. Additionally or alternatively, the moving element may have associated environmental data which may be used to determine predicted drivable/undrivable trajectories. As mentioned above, the updated obstacle detection heuristics may be evaluated based on these predicted drivable/undrivable trajectories and the traversed or partially traversed trajectories of the moving elements.

One example of moving elements may be other robotic devices. The trajectories of these other robotic devices may be stored in a server device in a canonical world frame by each of the other robotic devices that is navigating using their own localized pose in the world. The robotic device that is updating its obstacle detection heuristics may then send a request to the server device for the other robotic device trajectories in that world frame to be used to verify the obstacle detection heuristics. Additionally or alternatively, the trajectories of each of the other robotic devices may be sent directly to the robotic device that is updating its obstacle detection heuristics. To accommodate potential changes in the environment, the other robotic device trajectories may be associated with a timestamp and/or a timeframe, and only robotic device trajectories within a certain threshold timeframe may be considered in verifying the obstacle detection heuristics.

In further examples, moving elements may include operators, pets, and other objects that cannot automatically send their trajectory data to a server. In these examples, sensors (e.g., motion capture cameras) mounted around the environment may be used to detect the moving elements and their respective moving element trajectories. To avoid circular heuristic updating, these sensors may be associated with other computing devices running distinct object detection heuristics (in contrast to the heuristics used by the robotic device). These moving elements and their respective moving element trajectories may be sent to a server or sent directly to the robotic device that is updating its obstacle detection heuristics to facilitate verification of the updated obstacle detection heuristics.

Regardless of the specific moving element(s), the robotic device may use these other past trajectories of the moving elements as a basis to evaluate the updated obstacle detection heuristics. After having determined updated obstacle detection heuristics in the way described above, the robotic device may calculate one or more other predicted drivable areas in the environment based on environmental sensor data that the robotic device has collected (e.g., the canonical world view). If the one or more other predicted drivable areas in the environment include the one or more other past trajectories, the updated obstacle detection heuristics may be used to determine future navigation of the robotic device. In contrast, if the one or more other predicted drivable areas in the environment omit the one or more other past trajectories, the obstacle detection heuristics (before the update) may be used to determine future navigation of the robotic device.

Similarly, the robotic device may use past unsuccessful trajectories of the moving elements as a basis to evaluate the updated obstacle detection heuristics. For example, another robotic device may report an unsuccessful trajectory or a sensor may detect a moving element being stalled along an unsuccessful trajectory. The robotic device may infer that these other unsuccessful trajectories are also not traversable for itself. After having updated the obstacle detection heuristics, the robotic device may determine predicted undrivable areas in the environment using environmental data collected by the robotic device (e.g., the canonical world view), and based on the predicted undrivable areas in the environment including the one or more other unsuccessful trajectories, the updated obstacle detection heuristics may be used to determine future navigation of the robotic device. In contrast, if the predicted undrivable areas in the environment do not include the one or more unsuccessful trajectories, the obstacle detection heuristics before the update may be used to determine future navigation of the robotic device.

In some examples, the one or more other past trajectories navigated by the moving elements and/or the one or more other unsuccessful trajectories in the environment partially navigated by the moving elements may have associated other initial environmental data. The robotic device may use this other initial environmental data to determine predicted trajectories and/or predicted unsuccessful trajectories. Based on the predicted drivable areas including the other past trajectories and/or based on the predicted unsuccessful trajectories including the other unsuccessful trajectories, the updated obstacle detection heuristics may be used to determine future navigation of the robotic device. In contrast, if the predicted drivable areas in the environment do not include the one or more other past trajectories and/or if the predicted undrivable areas in the environment do not include the one or more other unsuccessful trajectories, the obstacle detection heuristics before the update may be used to determine future navigation of the robotic device.

III. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:

receiving initial environmental sensor data associated with a robotic device navigating in an environment;

updating an optimization framework associated with control of the robotic device, wherein the optimization framework comprises a machine learning model;

applying the updated optimization framework to the initial environmental sensor data to determine one or more predicted drivable areas for the robotic device in the environment;

evaluating the updated optimization framework based on a determination of whether the one or more predicted drivable areas include one or more areas of the environment confirmed to be drivable based on the initial environmental sensor data; and based on determining that the one or more predicted drivable areas includes the one or more areas confirmed to be drivable, navigating the robotic device using the updated optimization framework.

2. The method of claim 1, wherein the initial environmental sensor data is associated with one or more trajectories followed by the robotic device, and wherein the one or more areas of the environment confirmed to be drivable were traversed by the robotic device following the one or more trajectories.

3. The method of claim 1, wherein the initial environmental sensor data is associated with one or more trajectories followed by a moving element in the environment, and wherein the one or more areas of the environment confirmed to be drivable were traversed by the moving element following the one or more trajectories.

4. The method of claim 1, wherein updating the optimization framework is based on subsequent environmental sensor data.

5. The method of claim 1, further comprising:

receiving one or more unsuccessful trajectories partially navigated by the robotic device in the environment;

determining one or more further updates to the optimization framework;

determining, based on the one or more further updates to the optimization framework, one or more predicted undrivable areas in the environment; and based on the one or more predicted undrivable areas in the environment including the one or more unsuccessful trajectories, using the one or more further updates to the optimization framework to determine further navigation of the robotic device.

6. The method of claim 5, further comprising identifying the one or more unsuccessful trajectories partially navigated by the robotic device based on one or more operator interrupts of robot navigation.

7. The method of claim 5, wherein the one or more predicted undrivable areas are represented by one or more occupancy maps comprising one or more binary grid cells indicating drivability and corresponding to locations in the environment, wherein the method further comprises:

determining one or more past occupancy maps, wherein using the one or more further updates to the optimization framework to determine future navigation is further based on the one or more past occupancy maps.

8. The method of claim 7, further comprising:

determining a count of one or more false positive binary grid cells in each of the one or more past occupancy maps, based on the binary grid cell being indicated as drivable and the corresponding location being indicated as part of the one or more unsuccessful trajectories; and based on the count of the one or more false positive binary grid cells being below a threshold, using the one or more further updates to the optimization framework to determine future navigation of the robotic device.

9. The method of claim 7, further comprising:

determining a count of one or more false positive binary grid cells in each of the one or more past occupancy maps, based on the binary grid cell being indicated as non-drivable and the corresponding location being indicated as part of one or more past trajectories navigated by the robotic device; and based on the count of the one or more false positive binary grid cells being above a threshold, using the one or more further updates to the optimization framework to determine future navigation of the robotic device.

10. The method of claim 1, further comprising:

receiving one or more unsuccessful trajectories partially navigated by a moving element other than the robotic device in the environment;

determining one or more further updates to the optimization framework;

determining, based on the one or more further updates to the optimization framework, one or more predicted undrivable areas in the environment; and based on the one or more predicted undrivable areas in the environment including the one or more unsuccessful trajectories, using the one or more further updates to the optimization framework to determine further navigation of the robotic device.

11. The method of claim 1, wherein the environment is a first environment, wherein updating the optimization framework is based on subsequent environmental data associated with a second environment different from the first environment.

12. The method of claim 1, wherein the method further comprises:

receiving a plurality of past trajectories navigated by the robotic device in a plurality of environments; and selecting, from the plurality of past trajectories navigated by the robotic device, one or more past trajectories navigated by the robotic device in the environment, wherein navigating the robotic device using the updated optimization framework is based on determining that the one or more predicted drivable areas include the one or more past trajectories.

13. The method of claim 1, wherein the environment is a first environment, wherein updating the optimization framework comprises:

determining, based on subsequent environmental sensor data, a second environment; and determining that the second environment is different than the first environment, wherein updating the optimization framework is in response to determining that the second environment is different than the first environment.

14. The method of claim 1, further comprising:

determining that a threshold amount of time passed between collection of the initial environmental sensor data and collection of subsequent environmental data, wherein determining the one or more predicted drivable areas in the environment is in response to determining that the threshold amount of time has passed between the collection of the initial environmental sensor data and the collection of the subsequent environmental data.

15. The method of claim 1, wherein the optimization framework is configured to output obstacle detection heuristics.

16. The method of claim 1, wherein the one or more predicted drivable areas are represented by one or more occupancy maps comprising one or more binary grid cells indicating driveability and corresponding to locations in the environment, wherein the method further comprises:

determining, based on the updated optimization framework, one or more past occupancy maps, wherein using the updated optimization framework to determine future navigation of the robotic device is further based on the one or more past occupancy maps.

17. The method of claim 16, further comprising:

determining a count of one or more false negative binary grid cells in each of the one or more past occupancy maps, based on the binary grid cell being indicated as non-drivable and the corresponding location being indicated as part of one or more past trajectories navigated by the robotic device; and based on the count of the one or more false negative binary grid cells being below a threshold, using the updated optimization framework to determine future navigation of the robotic device.

18. A computing device configured to:

receive initial environmental sensor data associated with a robotic device navigating in an environment;

update an optimization framework associated with control of the robotic device, wherein the optimization framework comprises a machine learning model;

apply the updated optimization framework to the initial environmental sensor data to determine one or more predicted drivable areas for the robotic device in the environment;

evaluate the updated optimization framework based on a determination of whether the one or more predicted drivable areas include one or more areas of the environment confirmed to be drivable based on the initial environmental sensor data; and based on determining that the one or more predicted drivable areas includes the one or more areas confirmed to be drivable, navigate the robotic device using the updated optimization framework.

19. A non-transitory computer readable medium comprising program instructions executable by at least one processor to cause the at least one processor to perform functions comprising:

receiving initial environmental sensor data associated with a robotic device navigating in an environment;

updating an optimization framework associated with control of the robotic device, wherein the optimization framework comprises a machine learning model;

applying the updated optimization framework to the initial environmental sensor data to determine one or more predicted drivable areas for the robotic device in the environment;

evaluating the updated optimization framework based on a determination of whether the one or more predicted drivable areas include one or more areas of the environment confirmed to be drivable based on the initial environmental sensor data; and based on determining that the one or more predicted drivable areas includes the one or more areas confirmed to be drivable, navigating the robotic device using the updated optimization framework.

* * * * *